United States Patent [19]

Paranjpe et al.

[11] 4,031,563

[45] June 21, 1977

[54] JET DROP RECORDING HEAD HAVING AN IMPROVED POROUS DEFLECTION RIBBON

[75] Inventors: Suresh C. Paranjpe, Xenia; Daniel W. Moore, Dayton, both of Ohio

[73] Assignee: The Mead Corporation, Dayton, Ohio

[22] Filed: Jan. 29, 1976

[21] Appl. No.: 653,597

[52] U.S. Cl. .................................... 346/75; 118/50; 346/140 R

[51] Int. Cl.² ........................................ G01D 15/16

[58] Field of Search ........... 346/75, 140 R; 118/50, 118/50.1, 628

[56] References Cited

UNITED STATES PATENTS

| | | | |
|---|---|---|---|
| 3,701,998 | 10/1972 | Mathis | 346/75 |
| 3,955,203 | 5/1976 | Chocholaty | 346/75 |

*Primary Examiner*—Joseph W. Hartary

*Attorney, Agent, or Firm*—Biebel, French & Nauman

[57] ABSTRACT

A jet drop recording head having means for generating two parallel rows of drop streams and means for selectively charging drops in the streams uses a pair of opposed catchers disposed outwardly of the rows of drop streams and a charged deflection ribbon between the rows of drop streams. A drop deflecting voltage is applied to the deflection ribbon and the catchers are grounded so that the charged drops are deflected to the catchers and do not strike the printing surface while the uncharged drops pass between the deflection ribbon and the catchers and are deposited on the printing surface. The ribbon is porous and has a suction applied to it so that a mist which may collect upon it is ingested into the ribbon. The porous deflection ribbon may be made of a knit cloth material laminated between two layers of conductive metal screen material. Alternatively a brass screen material may be spiral wrapped around a number of stainless steel wires to form the porous ribbon. In another ribbon construction, the ribbon is formed of flattened tubing and the pores in the ribbon are arranged so that the liquid ingestion characteristics of the ribbon are substantially uniform along its length.

5 Claims, 7 Drawing Figures

JET DROP RECORDING HEAD HAVING AN IMPROVED POROUS DEFLECTION RIBBON

BACKGROUND OF THE INVENTION

This invention relates generally to the field of fluid drop generation and the application thereof to jet drop recorders of the type shown in U.S. Pat. No. 3,701,998 to Mathis, issued Oct. 31, 1972. In recorders of this type, there are a pair of rows of orifices which receive an electrically conductive recording fluid, such as for instance a water base ink, from a pressurized fluid manifold and eject the fluid in two rows of parallel streams. The fluid flows through orifices in a plate with the formation of drops being stimulated by the application of a series of traversing waves to the plate. This method of drop generation is more completely described in U.S. Pat. No. 3,739,393 to Lyon et al, issued June 12, 1973.

Graphic reproduction in recorders of this type is accomplished by selectively charging and deflecting some of the drops in each of the streams and thereafter disposing the uncharged drops on a moving web of paper or other material. Charging is accomplished by application of binary charge control signals to charging electrodes near the edge of the streams. As the drops separate from their parent fluid filaments, they carry a portion of the charge applied by the charging electrodes. Thereafter the drops pass through electrostatic fields which have no effect upon the charged drops but which cause the charged drops to be deflected for catching by one or the other of a pair of catchers which service the rows of streams.

U.S. Pat. No. 3,787,883 to Cassill, issued Jan. 22, 1974, discloses apparatus for creating the deflecting electrostatic fields. A thin deflection ribbon is positioned between and parallel to the two rows of parallel drop streams with the catchers positioned outwardly of the drop streams. A voltage is applied between the deflection ribbon and the catchers such that charged ink drops will be deflected to one of the two catchers.

The apparatus generating the fluid drops may also occasionally generate droplets of small size which form an ink mist. While very little of this mist will be present at any time, ink build-up on various surfaces of the printer may result over a long period of time. An unwanted ink mist in the printer may also result from crooked ink jets or from difficulties encountered in starting up or shutting down the printer. One approach taken to avoid build-up on the upper surface of a catcher is shown in U.S. Pat. No. 3,777,307 to Duffield, issued Dec. 4, 1973 in which a catcher having a porous upper surface is disclosed. A compartment within the catcher is connected to a vacuum source such that ink on the upper surface of the catcher is drawn into the compartment and then drawn off.

When the type of ink jet printer having a number of deflection electrodes surrounding each stream of ink drops, it is known to provide grooves in the electrodes. The ink droplets deposited on the electrodes are drawn into the grooves and transported away from the electrode surface by virtue of the capillary action of the grooves.

Heretofore ink mist build-up on a deflection ribbon has generally been avoided through periodic cleaning of the ribbon. This cleaning requires that the printing operation be temporarily stopped and is thus inconvenient as well as expensive. If the mist of conductive ink were permitted to build-up, however, the electrical efficacy of the ribbon would be gradually altered. Such a build-up may increase the likelihood of a short between the catchers and the ribbon or may interfere with the operation of the ink jets. To avoid these disadvantages, a porous deflection ribbon has been developed and is the subject of U.S. Pat. application Ser. No. 653,194, filed Jan. 28, 1976 and assigned to the assignee of the present invention. A deflection ribbon of constant porosity along its length is somewhat disadvantageous, however, in that the liquid ingestion characteristics of the ribbon will vary greatly.

SUMMARY OF THE INVENTION

In accordance with the present invention there is provided a jet drop recording head comprising means for generating two parallel drop streams. A means is provided for selectively charging the drops. A pair of opposed catchers disposed outwardly of the rows of drop streams and parallel thereto is grounded such that they function as deflection electrodes. A deflection ribbon to which is applied a drop deflecting voltage of the same polarity as the charge applied to the drops extends between the rows of drop streams in parallel relation thereto. The deflection ribbon is porous for ingestion of mist collecting thereon, with the total cross-sectional area of the pores per unit surface area of ribbon varying along the length of the ribbon. A non-conductive evacuation line may be connected to the ribbon and a means for applying suction connected to the line.

Accordingly it is an object of the present invention to provide a jet drop recording head having a deflection ribbon which is self-cleaning; to provide such a head in which the deflection ribbon is porous; to provide such a head in which an evacuating suction is applied to the ribbon; and to provide such a head in which the porosity of the deflection ribbon varies along the length of the ribbon.

Other objects and advantages of the present invention will be apparent from the following description, the accompanying drawings and the appended claims.

DESCRIPTION OF THE PREFERRED EMBODIMENTS

Figure 1:
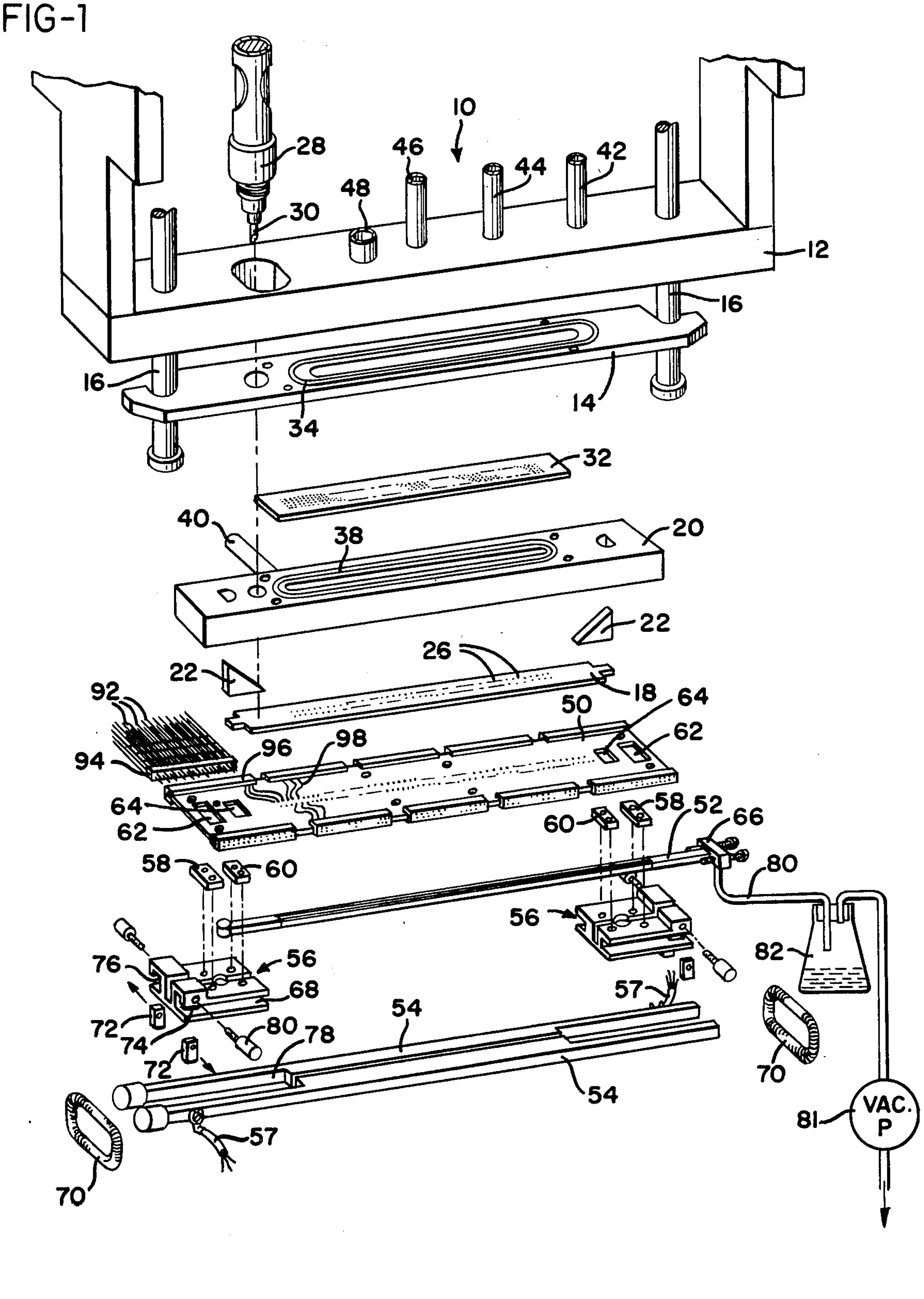
FIG. 1 is an exploded perspective view of a recording head assembly.

With reference to FIG. 1 of the drawings it will be seen that the various elements of a head assembly 10 are assembled for support by a support bar 12. Assembly thereto is accomplished by attaching the elements by means of the machine screws (not shown) to a clamp bar 14 which is in turn connected to the support bar 12 by means of a clamp rods 16.

A means for generating two parallel rows of drop streams comprises an orifice plate 18 soldered, welded or otherwise bonded to fluid supply manifold 20 with a pair of wedge-shaped acoustical dampers 22 therebetween. Orifice plate 18 is preferably formed of a relatively stiff material such as stainless steel or nickel coated beryllium-copper but is relatively thin to provide the required flexibility for direct contact stimulation.

Orifice plate 18 contains two rows of orifices 26 for forming the two parallel rows of drop streams, and is preferably stimulated by a stimulator 28 which is threaded into clamp bar 14 to carry a stimulation probe 30 through the manifold 20 and into direct contact with plate 18. Orifice plate 18, manifold 20, clamp bar 14 together with a filter plate 32 and O rings 34, 35 and 38 (see FIG. 3) comprise a clean package which may be preassembled and kept closed to prevent dirt or foreign material from reaching and clogging orifices 26. Conduit 40 may be provided for flushing of the clean package. Service connections for the recording head include a fluid supply tube 42, air exhaust and inlet tubes 44 and 46, and a tube 48 for connection to a pressure transducer (not shown).

Means for selective charging of the drops comprises a charge ring plate 50. A deflection ribbon 52 is positioned to extend between the two rows of drop streams in parallel relation thereto. A pair of opposed catchers 54 are disposed outwardly of the rows of drop streams and are supported by holders 56 which are fastened directly to fluid supply manifold 20. Wires 57 comprise a means for grounding the catchers 54 and causing them to function as deflection electrodes.

Figure 3:
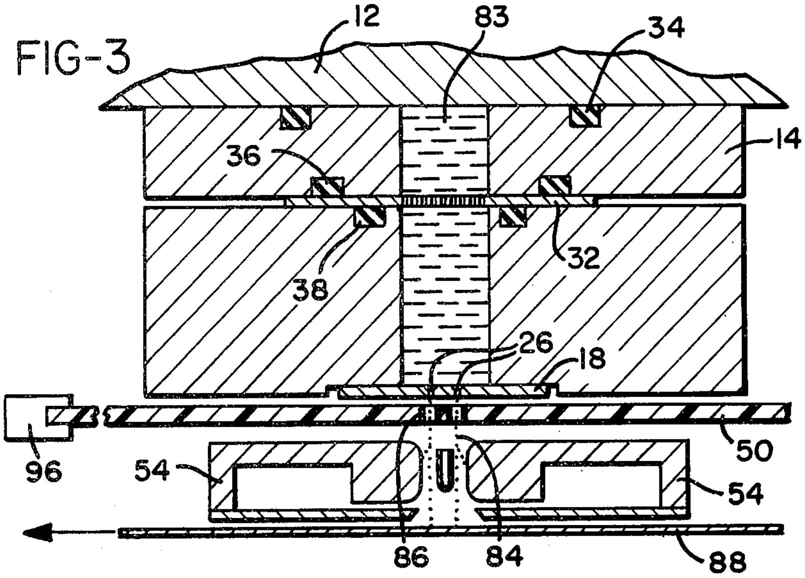
FIG. 3 is a sectional view through the assembly of FIG. 1.

Spacers 58 and 60 reach through apertures 2 and 64, respectively in charge ring plate 50 to support holders 56 without stressing or constraining charge ring plate 50. Deflection ribbon 52 is also supported by holders 56 and is stretched tightly therebetween by means of tightening block 66. Ribbon 52 extends longitudinally between catchers 54 as best shown in FIG. 3.

Catchers 54 are laterally adjustable relative to ribbon 52. This adjustability is accomplished by assembling the head with catchers 54 resting in slots 68 of holders 56, and urging them mutually inward with a pair of elastic bands 70. Adjusting blocks 72 are inserted upwardly through recesses 74 and 76 to bear against faces 78 of catchers 54, and adjusting screws 80 are provided to drive adjusting blocks 72 and catchers 54 outwardly against elastic bands 70. Holders 56 are made of insulative material which may be any available reinforced plastic board.

Figure 2:
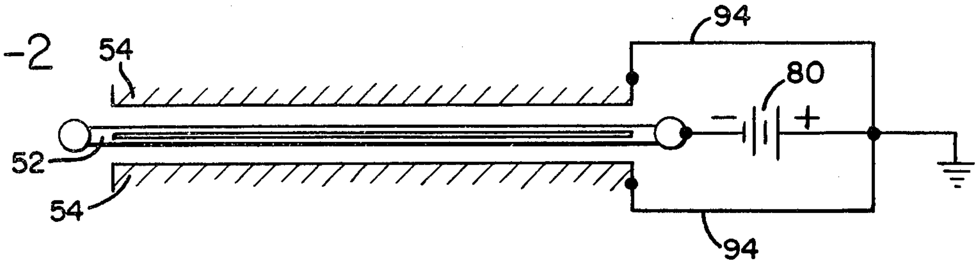
FIG. 2 is a diagrammatic representation of the electrical connections for the deflection strip and catchers.

As shown schematically in FIG. 2, means for applying a drop deflecting voltage to deflection ribbon 52 may comprise a battery 79 or any other source of electrical potential. A pair of equal strength, oppositely directed electrical deflection fields are induced between ribbon 52 and catchers 54. If a voltage of like polarity to the charge applied to the charged drops is applied to the ribbon, the charged drops will be deflected outwardly from the ribbon toward the catchers 54.

As will be described more fully below, the deflection ribbon 52 of the present invention is porous for ingestion of any ink mist which may collect on the ribbon. The ingestion process may be aided by the use of a non-conductive ink evacuation line 80 which connects a pump 81 to the ribbon 52 and acts as a means for applying an ink evacuating suction. An ink trap 82 in line 80 insures that ribbon 52 is electrically isolated from the rest of the recording head. It should be understood that some applications may not require the use of an ink evacuating suction.

Figure 4:
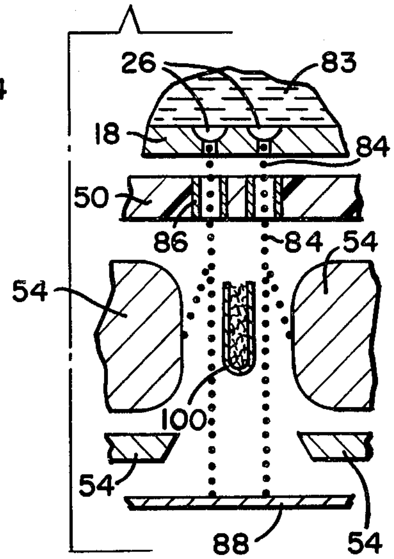
FIG. 4 is an enlarged view of a portion of FIG. 3.

The fully assembled recording head is shown in cross-section in FIGS. 3 and 4. As therein illustrated, ink fluid 83 flows downwardly through orifices 26 forming two rows of streams which break up into two curtains of drops 84. Drops 84 then pass through two rows of charge rings 86 in charge ring plate 50 and thence onto one of the catchers 54, or onto the moving web of paper 88. Switching of drops between catch and deposit trajectories is accomplished by electrostatic charging and deflection. Coordinated printing capability is achieved by staggering the two rows of streams in accordance with the teachings of Taylor et al, U.S. Pat. No. 3,560,641. As taught in that patent, the drops in the forward row of streams (i.e. the row most advanced in the direction of web movement) are switched in a time reference frame delayed from that of the rear row by a time $d/V$ where $d$ is the row spacing and V is the web speed. This produces a coherence such that the two rows of streams function as a single row with an effective stream spacing equal to half the actual spacing in either of the real rows.

Formation of drops 84 is closely controlled by application of a constant frequency, controlled amplitude, stimulating disturbance to each of the fluid streams emanating from orifice plate 18. Disturbances for this purpose may be set up by operating transducer 28 to vibrate probe 30 at constant amplitude and frequency against plate 18. This causes a continuing series of bending waves to travel the length of plate 18; each wave producing a drop stimulating disturbance each time it passes one of the orifices 26. Dampers 22 prevent reflection and repropagation of these waves. Accordingly each stream comprises an unbroken fluid filament and a series of uniformly sized and regularly spaced drops all in accordance with the well known Rayleigh jet break-up phenomenon.

As each drop 84 is formed it is exposed to the charging influence of one of the charge rings 86. If the drop is to be deflected and caught, an electrical charge is applied to the associated charge ring 86 during the instant of drop formation. This causes an electrical charge to be induced in the tip of the fluid filament and carried away by the drop. As the drop traverses the deflecting field set up between ribbon 52 and the face of the adjacent catcher, it is deflected to strike and run down the face of the catcher, where it is ingested, and carried off. Drop ingestion may be promoted by application of a suitable vacuum to the ends 90 of catchers 54. When drops which are to be deposited on the web 88, no electrical charge is applied to the associated charge rings.

Appropriate charges are applied to desired drops by setting up an electrical potential difference between orifice plate 18 (or any other conductive structure in electrical contact with the ink fluid supply) and each appropriate charge ring 86. As shown in FIGS. 1 and 2, these potential differences are created by grounding plate 18 and applying appropriately timed voltage pulses to wires 92 in connectors 94 (only one of which is illustrated). Connectors 94 are plugged into receptacles 96 at the edge of charge ring plate 50 and deliver appropriate voltage pulses over printed circuit lines 98 to charge rings 86.

Charge ring plate 50 is fabricated from insulative material and charge rings 86 are formed by coating the surfaces of orifices in the charge ring plate with a conductive material. Voltage pulses for the above purpose may be generated by circuits of the type disclosed in Taylor et al, supra, and wires 92 receiving these pulses may be matched with charge rings 86 on a one-to-one basis. Alternatively, the voltage pulses may be multiplexed to decrease the number of wires and connectors. For such an alternative embodiment solid state demultiplexing circuits may be employed to demultiplex the signals and route the pulses to the proper charge rings. Such solid state circuits may be manufactured by known methods as a permanent part of charge ring plate 50.

Figure 5:
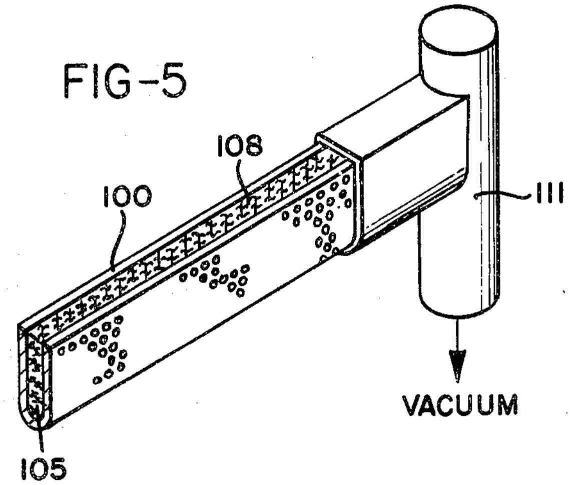
FIG. 5 is an enlarged perspective view of a portion of a porous deflection ribbon.

Referring now to FIG. 5, there is shown in perspective a portion of one type of porous deflection ribbon. A metal screen 100 is formed into a U-shaped strip around a knit cloth material 105. The deflection ribbon is thus a laminated configuration in which the screen completely covers the cloth 105 except for a thin slot 108 in upper portion of the screen structure. A vacuum line 111 is connected to one end of the ribbon. In operation, a drop deflecting potential is applied to metal screen 100 to deflect the charged drops away from the ribbon and toward associated catchers. Any ink mist settling on the surface of the deflection ribbon will be ingested into the ribbon and carried away by vacuum line 111.

Figure 6:
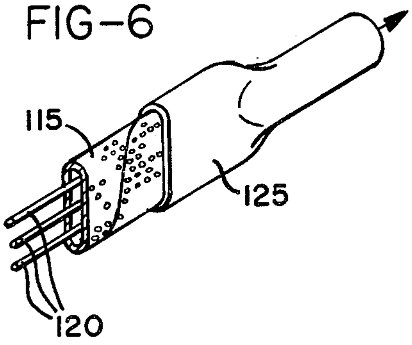
FIG. 6 is an enlarged perspective view of a portion of another type of a porous deflection ribbon.

FIG. 6 illustrates a second type of porous deflection ribbon. In this configuration, a fine brass screen 115 is spiral wrapped around lengths of stainless steel wire 120. The screen is then pressed flat and soldered into the ends of the flattened brass tubing 125. A vacuum may be applied to tubing 125 to insure ingestion of any ink mist forming on the surface of the ribbon.

In regard to the ribbons shown in FIGS. 5 and 6, ink evacuating suction may be applied either to one or to both ends of the deflection ribbon. Successful operation with vacuum applied to only one end of the porous ribbon may be possible with a ribbon of relatively short length. Longer ribbons may require suction at both ends to insure ink ingestion along the full length of the ribbon.

Figure 7:
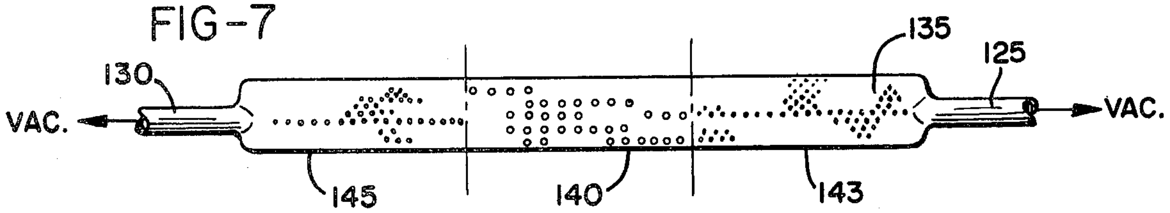
FIG. 7 is an enlarged view showing a deflection ribbon having non-uniform porosity.

FIG. 7 illustrates a third type of porous deflection ribbon. This configuration may be formed through a chemical milling fabrication technique. Tubing is flattened and an array of small holes etched through the tubing wall. The deflection ribbon illustrated is provided with suction at both of its ends 125 and 130. It will be recognized that the pressure difference between the inside of the ribbon and the atmosphere surrounding the ribbon will not be uniform along the ribbon's length and the efficacy of ink ingestion into the ribbon will therefore vary along the ribbon. In order to compensate for this pressure variation, the pores in tubing 135 are formed such that the total cross-sectional area of the pores per unit area of ribbon varies along the length of the ribbon. This non-uniform porosity may be effectuated by varying pore size. Larger pores may be formed in the central area of the ribbon 140 while smaller holes are formed at ends 143 and 145 of the ribbon. Pore diameter may vary between 0.020 and 0.002 inch for efficient ribbon operation. Alternatively, variation in porosity may be accomplished using uniformly sized pores but placing more of them in areas desired to be more porous.

While the forms of apparatus herein described constitute preferred embodiments of the invention, it is to be understood that the invention is not limited to these precise forms of apparatus, and that changes may be made therein without departing from the scope of the invention.

What is claimed is:

1. A self-cleaning deflection ribbon assembly for use in a jet drop recording head having means for generating a plurality of drop streams, each stream consisting of a series of liquid recording drops, means for selectively charging said drops, and a source of drop deflecting potential, comprising:

a porous deflection ribbon having an electrically conductive surface defining a plurality of liquid ingesting pores, the total cross-sectional area of said pores per unit area of said ribbon varying progressively from a smaller value at a point adjacent a first end of said ribbon to larger values at points further removed therefrom, means for connecting the source of drop deflecting potential to said electrically conductive surface, and means for applying an evacuating suction of said first end of said ribbon, wherein variations in drop ingesting effectiveness due to variations in evacuating suction along the extent of the ribbon are minimized.

2. The assembly of claim 1 in which the size of said pores in non-uniform along the length of said ribbon and in which the pores in said ribbon adjacent said first end have a smaller cross-sectional area than the pores in said ribbon further removed from said first end such that the pressure variation along the ribbon is compensated.

3. The assembly of claim 1 further comprising:

means for applying an evacuating suction to the second end of said deflection ribbon opposite said first end, and in which the size of said pores in non-uniform along the length of said ribbon, the pores adjacent said first and second ends of said deflection ribbon having a smaller cross-sectional area than the pores in the central area of said deflection ribbon such that the pressure variation along the length of the deflection ribbon is compensated.

4. The assembly of claim 1 in which the number of pores per unit area of said ribbon adjacent said first end is substantially less than the number of pores per unit area of said ribbon further removed from said first end, such that the pressure variation along the ribbon is compensated.

5. The assembly of claim 1 further comprising means for applying an evacuating suction to the second end of said deflection ribbon opposite said first end, and in which the number of said pores per unit area of said ribbon adjacent said first and second ends of said deflection ribbon is substantially less than the number of pores per unit area of said ribbon in the central area of said deflection ribbon such that the pressure variation along the length of the deflection ribbon is compensated.

* * * * *

UNITED STATES PATENT AND TRADEMARK OFFICE

CERTIFICATE OF CORRECTION

PATENT NO. : 4,031,563

DATED : June 21, 1977

INVENTOR(S) : Suresh C. Paranjpe & Daniel W. Moore

It is certified that error appears in the above-identified patent and that said Letters Patent are hereby corrected as shown below:

Column 5, line 4, "supra" should be underlined.

Column 6, line 41, "in" should be --is--.

Signed and Sealed this

*Twenty-fifth* Day of *October 1977*

[SEAL]

*Attest:*

RUTH C. MASON
*Attesting Officer*

LUTRELLE F. PARKER
*Acting Commissioner of Patents and Trademarks*